Jan. 4, 1938. W. L. HUNTER 2,104,039

VALVE

Filed Sept. 25, 1935 2 Sheets-Sheet 1

INVENTOR
WILLIAM L. HUNTER
BY E. J. Andrews
ATTY

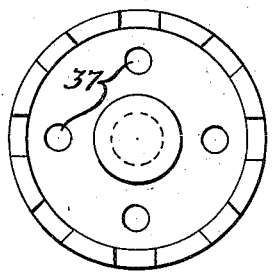
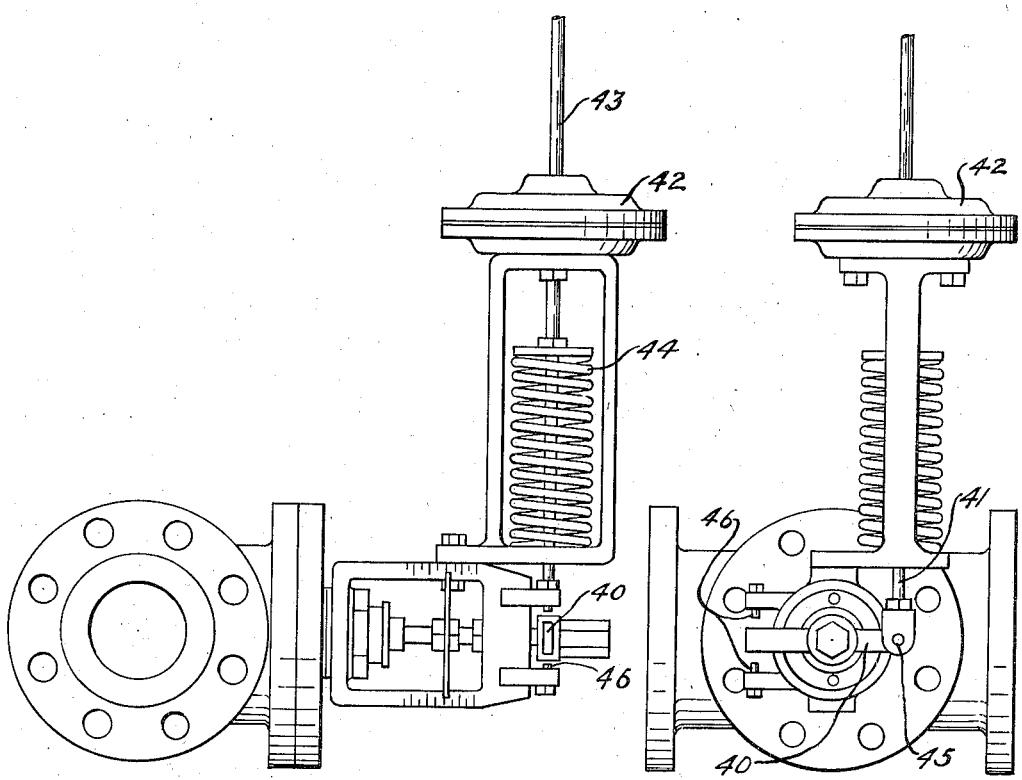

Patented Jan. 4, 1938

2,104,039

UNITED STATES PATENT OFFICE 2,104,039

VALVE

William L. Hunter, Erie, Pa., assignor to Northern Equipment Company, Erie, Pa., a corporation of Pennsylvania Application September 25, 1935, Serial No. 41,973

2 Claims. (Cl. 251—167)

This invention relates to valves, and particularly to rotating valves which are to be used as feed water valves for boilers and the like, and which are automatically operated by various types of feed water regulators. One object of the invention is to provide means for varying the effective sizes of the valve ports for a given amount of rotation of the valve plunger, so that the amount of water flowing will thus be varied to suit the needs.

Another object of the invention is to eliminate practically the undesirable effects of the flowing water on the operation of the valves. In these days of very high steam pressures and enormous boiler capacities, the flow of water through the feed valves under high pressures in large quantities ordinarily affects very materially the operation of the valves, making the movement of the plungers more or less erratic, causing chattering, increasing the force required to operate the valves, and being otherwise objectionable. These effects are substantially eliminated by the use of my valve. Also I provide means for making the valve entirely unbalanced, semi-balanced or entirely balanced.

Figure 1:
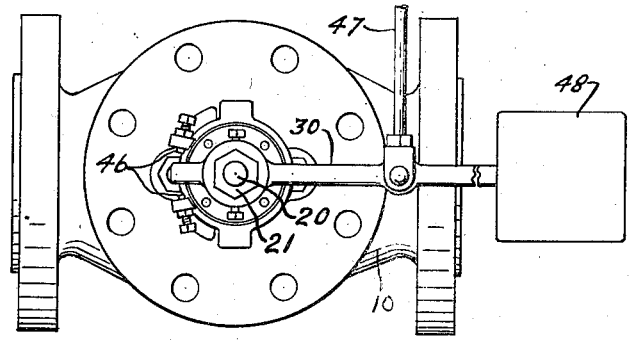
Figure 4:
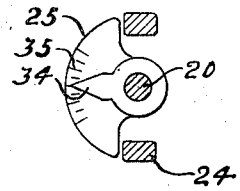
Figure 2:
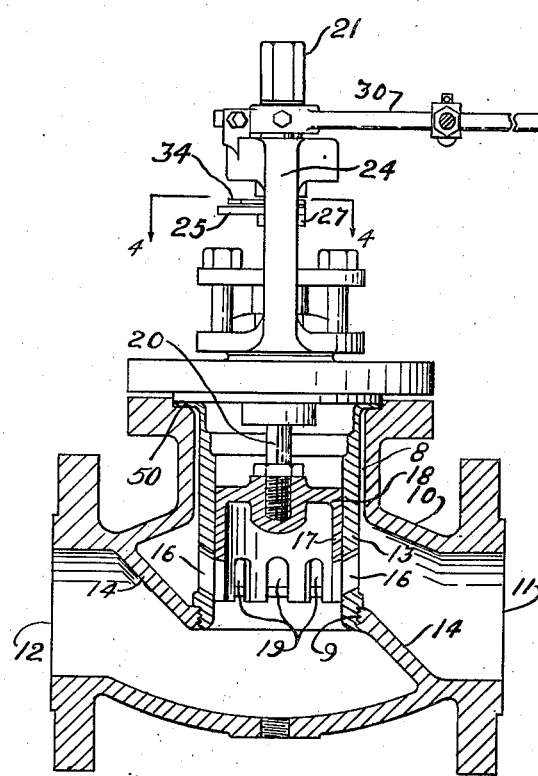
Figure 3:
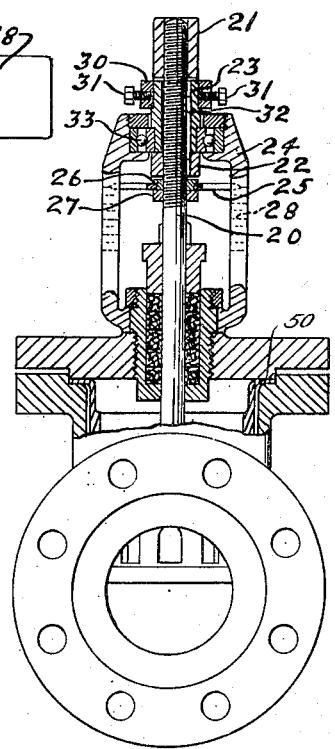

Of the accompanying drawings, Fig. 1 is an elevation of a valve which embodies features of my invention; Fig. 2 is a plan view thereof, with the valve proper in section; Fig. 3 is a plan view, at 90° from Fig. 2, with the valve operating means in section; Fig. 4 is a section along the line 4—4 of Fig. 2, with the background omitted; Fig. 5 is a similar view of a further modification; Fig. 6 is an elevation of valve operating means as applied to a diaphragm motor; and Fig. 7 is a view of the same at 90° from Fig. 6.

The valve of Figs. 1 to 3 comprises an ordinary valve casing 10, having an inlet 11 and an outlet 12. Within the casing is a partition 14, having an opening 9 therein in which is mounted the inner end of a cage 13, the outer end of the cage being mounted by means of a flexible flange 50 in an opening 8 in the wall of the casing opposite the partition. This flexible flange allows contraction and expansion of the cage without injury. When so arranged the water entering the inlet 11 is free to flow entirely around the cage.

Adjacent the inner end of the cage are ports 16 which are, preferably, equally spaced entirely around the cage. Within the cage is slidably and rotatably mounted a plunger 17. The plunger, in this instance, is entirely closed at its upper end 18, and is provided with ports 19 adjacent its inner end. These ports also are preferably equally spaced around the plunger and are spaced the same distance and are the same width as the ports 16. The valve is opened or closed by rotating the plunger by means of its spindle 20.

By having a large number of ports, with the ports 16 always symmetrical with reference to the ports 19, the flow of water is always entirely symmetrical with reference to the plunger irrespective of the amount of water flowing therethrough. And the inwardly inclined inner and outer edges of the ports 16 assist in directing the water inwardly axially of the plunger, thus preventing chattering and various eddy currents which would interfere with the smooth and easy operation of the plunger.

As a part of my invention I provide means whereby the plunger may be shifted axially in the cage, so as to vary the effective openings of the ports. As shown in Fig. 2 the plunger is positioned outwardly substantially the maximum amount. By forcing the plunger inwardly the effective openings of the ports will be reduced, just as would be accomplished by rotating the plunger in the closing direction. By this means the amount of water flowing may be varied independently of the rotational or angular position of the plunger. The shifting of the plunger axially may be accomplished manually or automatically. In this case I prefer to provide the following means for manual operation.

Threaded on the outer end of the spindle 20 are lock nuts 21 and 22. Between these nuts is a collar 23, slidably but non-rotatably mounted on the spindle 20. The collar is rotatably but non-slidably mounted in the bearing yoke 24 in any suitable manner. If it is desired to shift the plunger inwardly or outwardly it is necessary only to loosen the lock nuts and shift the spindle through the collar to the position desired, and then to set the lock nuts in the holding positions.

In order to indicate to the operator the longitudinal position of the plunger in the cage I provide an indicator 25. This indicator preferably consists of a segment of a disk coaxially and rotatably mounted on the spindle 20, and held in position by nuts 26 and 27. As the spindle is shifted longitudinally it carries with it the indicator, and a suitable scale 28 on the yoke arms indicates the position of the plunger in the cage. The yoke arms prevent rotation of the indicator as the spindle rotates.

This type of valve is particularly desirable as a feed water valve for boilers or the like when operated by any type of feed water regulator. Any suitable means may be provided for connecting the valve with the regulator. I prefer for the purpose to mount an arm 30 on the collar 23, fixing it thereto by means of bolts 31. By rotating this arm the collar, and thus the spindle and plunger, will be rotated and the opening of the ports of the valve varied. The collar is preferably keyed to the spindle by means of a key 32 which is fixed to the spindle or to the collar, and fits snugly but slidably in a groove in the other member.

To reduce the force required to rotate the plunger I prefer to mount the collar in ball bearings 33. And to indicate the angular position of the plunger with reference to the cage I provide an indicator 34 which is fixed with reference to the spindle in any suitable manner and coacts with a scale 35, which in this instance is formed on the indicator 25. By means of these two indicators 25 and 34 the magnitude of the port openings can be readily determined at any time and for any longitudinal or angular relation of the plunger to the cage.

The valve as indicated in Fig. 2 is a semi-balanced valve. It is substantially balanced angularly, but is unbalanced longitudinally. As the water flows there is a pressure on the closed end 18 of the plunger, in the direction of the ports, equal to the drop in pressure through the valve. This is sometimes desirable as it tends to take up any possible loose play longitudinally of the valve plunger. With boilers operating at enormous pressures and capacities it is desirable to have no effective loose play between the operating means and the valve plunger. With this valve there is a continuous pressure so that it is always held snugly against the collar 23.

Fig. 5 shows a substantially completely balanced plunger. The openings 37 in the outer end of the plunger, corresponding to the end 18 of Fig. 2, allow the water to flow freely through the plunger, so that the pressure of the water is always substantially the same in both directions on the end 18 of the plunger. Also the longitudinal edges of the ports bear the same angle to the walls so that there is substantially no tendency of the water to rotate the plunger. Also the outer edges of the ports are bevelled in the direction of flow, thus eliminating the tendency of the water to force the plunger in either longitudinal direction.

These valves may be connected up for operation by feed water regulators in any suitable manner, the regulator being connected directly or indirectly to the lever 30 or its equivalent. Figs. 6 and 7 show the valve connected to a diaphragm motor 42. The arm 40 corresponds to the lever 30 of Figs. 1 and 2, and a link 41 is pivoted to the arm by one end and is connected to the diaphragm in an ordinary manner by the other end. The diaphragm chamber of the motor 42 is in communication, by means of a pipe 43, with the pressure control portion of the boiler system. A spring 44 continuously tends to force the link towards the diaphragm. As the controlling pressure of the boiler or regulator varies the angular position of the arm 40 the angular position of the plunger in the cage will vary accordingly; thus allowing more or less water to flow to the boiler to suit the needs.

With a motor of this nature, if it is desired to open the valve more as the control pressure increases, the plunger is set so as to open the ports as the spring is compressed, the spring then tends at all times to close the valve. If it is desired to close the valve more as the control pressure increases, the bolts 31, Fig. 3, may be loosened and the angular position of the plunger changed so that, as the spring is compressed, the valve closes; the spring then tends at all times to open the valve. To limit the movement of the arm 40 stops 46 may be used so that the movement of the plunger rotation may be limited to the completely open or closed position, or otherwise as desired. Preferably the stops are adjustable, as shown in Fig. 1.

The mechanism of Figs. 6 and 7 is particularly applicable to the pressure generator type of feed water regulator. Other types of regulators, such as the float and the thermostat types, may be connected to the arm 30, or its equivalent, by means of a link 47 in an ordinary manner. It will be understood that, in such a case, the spindle of the plunger is mounted horizontally ordinarily, and in such a case a weight 48 may be mounted on the arm so as to operate the valve in one direction and thus to eliminate any loose play in the regulator mechanism.

I claim as my invention:

1. A valve comprising a casing having an inlet and an outlet, a partition between the inlet and the outlet and having an opening therethrough, the outer wall of the casing having an opening therethrough facing the partition opening, a cage with its ends fixed in the respective openings, and a plunger movably mounted in the cage, the cage having a flexible flange projecting angularly around one end by means of which that end of the cage is fixed in the casing opening.

2. A valve comprising a casing having an inlet and an outlet, a partition between the inlet and the outlet and having an opening therethrough, the outer wall of the casing having an opening therethrough facing the partition opening, a cage with its ends fixed in the respective openings, and a plunger movably mounted in the cage, the cage having a flexible flange projecting angularly around one end by means of which that end of the cage is fixed in one of the openings, whereby that end is movable in the opening by flexing the flange.

WILLIAM L. HUNTER.